United States Patent
Lu et al.

(10) Patent No.: US 7,520,027 B2
(45) Date of Patent: Apr. 21, 2009

(54) FRICTION ENHANCED HINGE TO PROVIDE POSITIONING FORCE TO HOLD A DISPLAY AT A POSITION AS REQUIRED

(75) Inventors: Sheng-Nan Lu, Shulin (TW); Chung-Yu Lee, Shulin (TW); Jia-Hao Hsu, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 442 days.

(21) Appl. No.: 11/373,222

(22) Filed: Mar. 9, 2006

(65) Prior Publication Data

US 2007/0143962 A1    Jun. 28, 2007

(30) Foreign Application Priority Data

Dec. 28, 2005    (TW) .............. 94222817 U

(51) Int. Cl.
E05C 17/64    (2006.01)
(52) U.S. Cl. .......................... 16/340; 16/337
(58) Field of Classification Search .............. 16/340, 16/337, 338; 361/680–683; 248/919–923; 455/575.1, 575.3, 575.4, 575.8, 550.1, 90.3; 348/794, 373, 333.06
See application file for complete search history.

(56) References Cited

U.S. PATENT DOCUMENTS

| 3,239,874 | A | * | 3/1966 | Sperzel | 16/338 |
| 6,154,925 | A | * | 12/2000 | Miura | 16/338 |
| 6,421,878 | B1 | * | 7/2002 | Kaneko et al. | 16/330 |
| 6,813,813 | B2 | * | 11/2004 | Lu et al. | 16/342 |
| 7,222,396 | B2 | * | 5/2007 | Lu et al. | 16/340 |
| 2005/0278895 | A1 | * | 12/2005 | Su | 16/340 |
| 2007/0174996 | A1 | * | 8/2007 | Lu et al. | 16/340 |
| 2007/0199179 | A1 | * | 8/2007 | Wang | 16/340 |

* cited by examiner

*Primary Examiner*—Chuck Y. Mah
(74) *Attorney, Agent, or Firm*—pattenttm.us

(57) ABSTRACT

A hinge includes a shank, a rotation bracket adapted to securely connect to a display of a laptop computer, a fixed bracket adapted to securely connect to a base of the laptop computer and at least one friction bracket securely connected to the fixed bracket and having friction pads provided on opposite sides of the at least one friction bracket. Each of the friction pads has an aperture so defined that after the threaded portion of the shank extends through the apertures of the friction pads, the friction pads pivot together with the shank to generate holding force with the fixed bracket for holding the display in position.

1 Claim, 5 Drawing Sheets

FRICTION ENHANCED HINGE TO PROVIDE POSITIONING FORCE TO HOLD A DISPLAY AT A POSITION AS REQUIRED

BACKGROUND OF THE INVENTION

1. Field of the Invention

The present invention relates to a hinge, and more particularly to a hinge having enhanced friction ability so that the hinge is able to hold a display of heavy weight at a position as required.

2. Description of the Prior Art

As well known in the art, a hinge is provided between two objects so as to provide a pivotal relationship between the two objects. Examples can be seen everywhere in our daily lives. A common example is the display and the base of a laptop computer, wherein the display pivots about a central axis of the hinge so that various observation angles are provided to different operators. In order to protect the display from damage resulted from collision with the base due to insufficient holding force to the display, the hinge is provided with friction pads to provide the required holding force to the display. Because the dimension of the display is becoming larger than ever, the conventional design of a hinge can no longer provide the required holding force to hold the display at a specific position, which often causes the display to fall to the base after the hinge is used for a period of time.

To overcome the shortcomings, the present invention tends to provide an improved hinge to mitigate the aforementioned problems.

SUMMARY OF THE INVENTION

The primary objective of the present invention is to provide a friction enhanced hinge to provide sufficient holding force to hold a display at a position as required.

In order to accomplish the aforementioned objective, the hinge of the present invention includes a shank, a rotation bracket, a fixed bracket, a friction bracket, friction pads, pads, a resilient assembly and a securing member. Therefore, with the friction pads provided on opposite sides of the friction bracket, the holding force to the display is enhanced.

Other objects, advantages and novel features of the invention will become more apparent from the following detailed description when taken in conjunction with the accompanying drawings.

DETAILED DESCRIPTION OF THE PREFERRED EMBODIMENT

Figure 1:
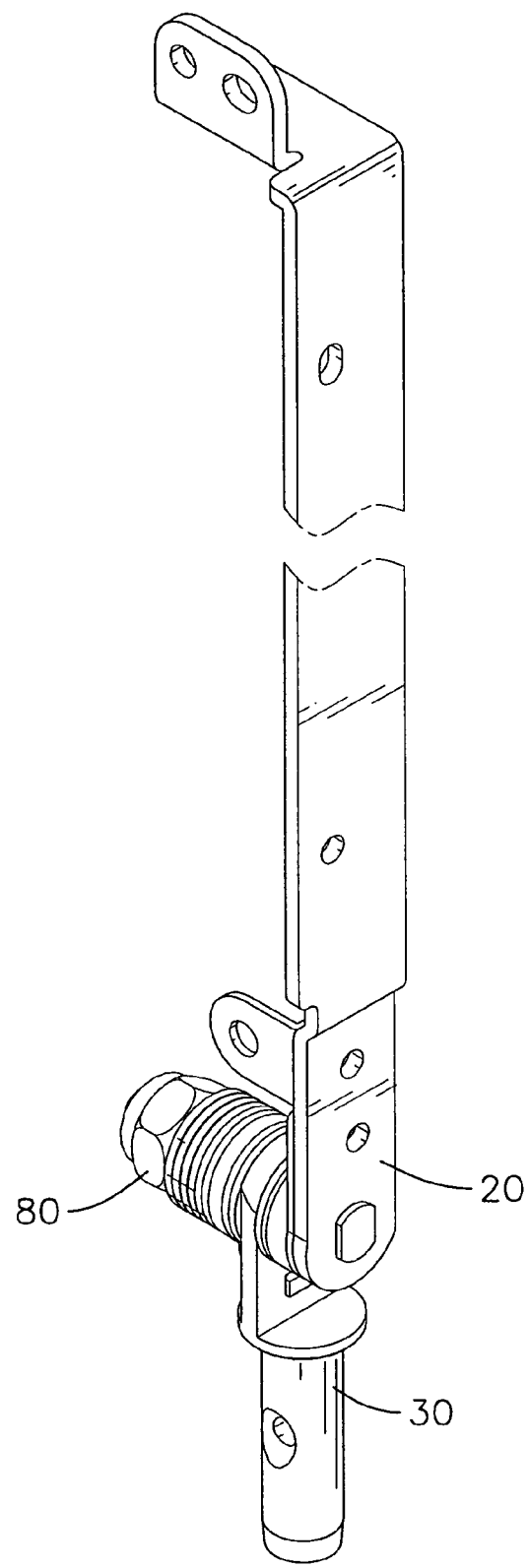
FIG. 1 is a perspective view of the hinge of the present invention.
Figure 2:
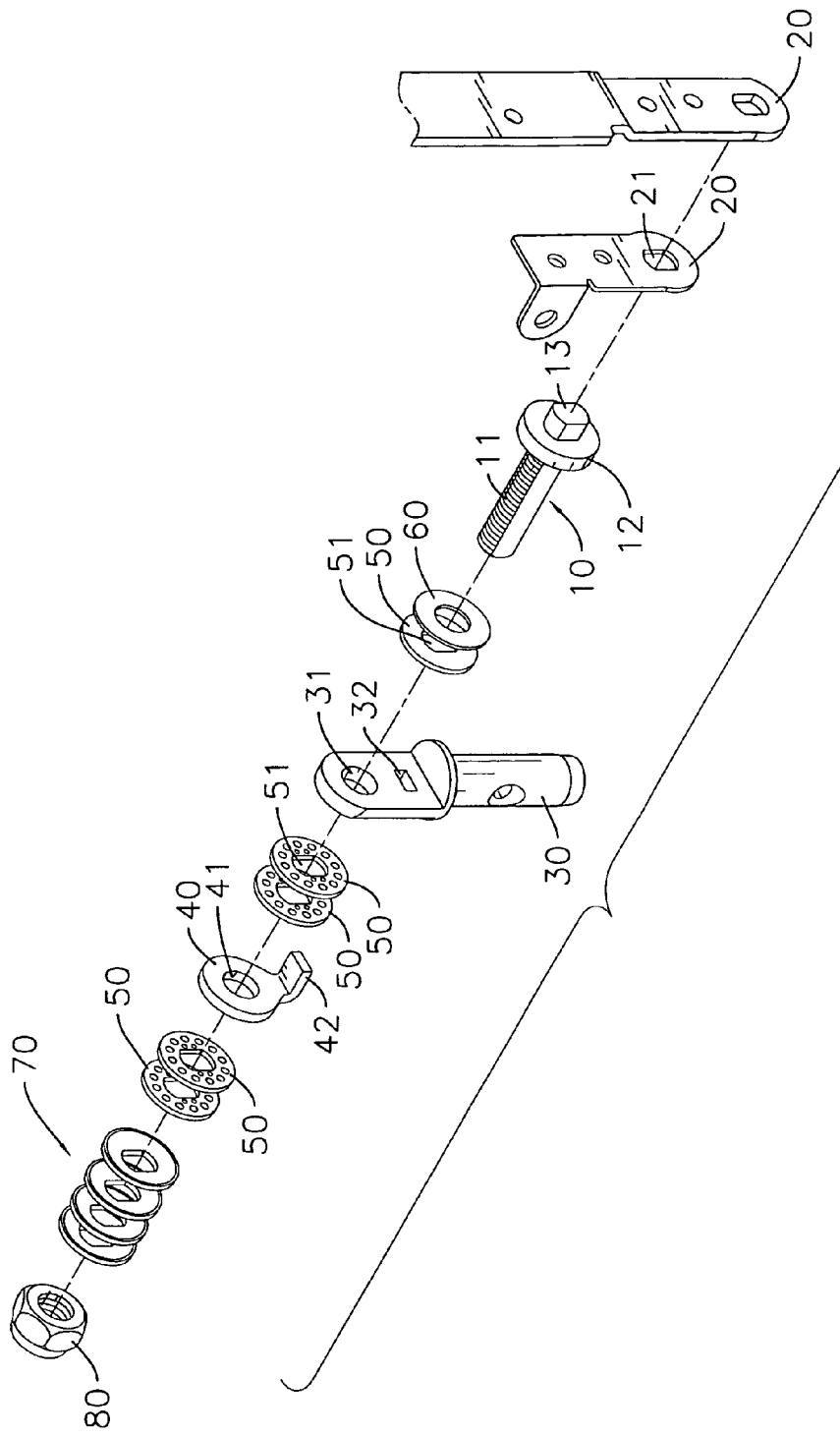
FIG. 2 is an exploded perspective view of the hinge of the present invention.

With reference to FIGS. 1 and 2, it is noted that the hinge in accordance with the present invention includes a shank (10), a rotation bracket (20), a fixed bracket (30), a friction bracket (40), friction pads (50), pads (60), a resilient assembly (70) and a securing member (80).

The shank (10) is composed of a threaded portion (11) configured to have an irregular shape and a head (13) integrally formed with the threaded portion (11) and having a shape the same as that of the threaded portion (11). A crown (12) is extended axially from an axis of the shank (10) at a joint between the threaded portion (11) and the head (13).

The rotation bracket (20) is adapted to engage with a display of a laptop computer and has a hole (21) defined therein and having a shape substantially the same as that of the head (13) such that the head (13) is able to extend into the hole (21) to secure engagement between the shank (10) and the rotation bracket (20).

The fixed bracket (30) is adapted to engage with a base of the laptop computer and has a through hole (31) defined to correspond to and receive therethrough the threaded portion (11) and a securing hole (32) defined adjacent to the through hole (31).

The friction bracket (40) includes an extending hole (41) corresponding to and receiving therethrough the threaded portion (11) of the shank (10) and a boss (42) extending from a peripheral edge of the friction bracket (40) to correspond to and extend into the securing hole (32) of the fixed bracket (30).

Each friction pad (50) is provided with an aperture (51) having a shape substantially the same as that of the threaded portion (11) of the shank (10) such that after the threaded portion (11) extends through the apertures (51) of each of the friction pads (50), there is no relative movement between the shank (10) and the friction pads (50).

The pads (60) and the resilient assembly (70) are mounted around the threaded portion (11) of the shank (10) and then the securing member (80), e.g. a nut, is able to threadingly connected to the threaded portion (11) of the shank (10) to secure the aforementioned elements on the shank (10). It is noted that opposite sides of the friction bracket (40) are provided with friction pads (50) so that when the shank (10) is pivoted relative to the fixed bracket (30), enhanced friction force is generated between the friction bracket (40) and the friction pads (50).

Figure 3:
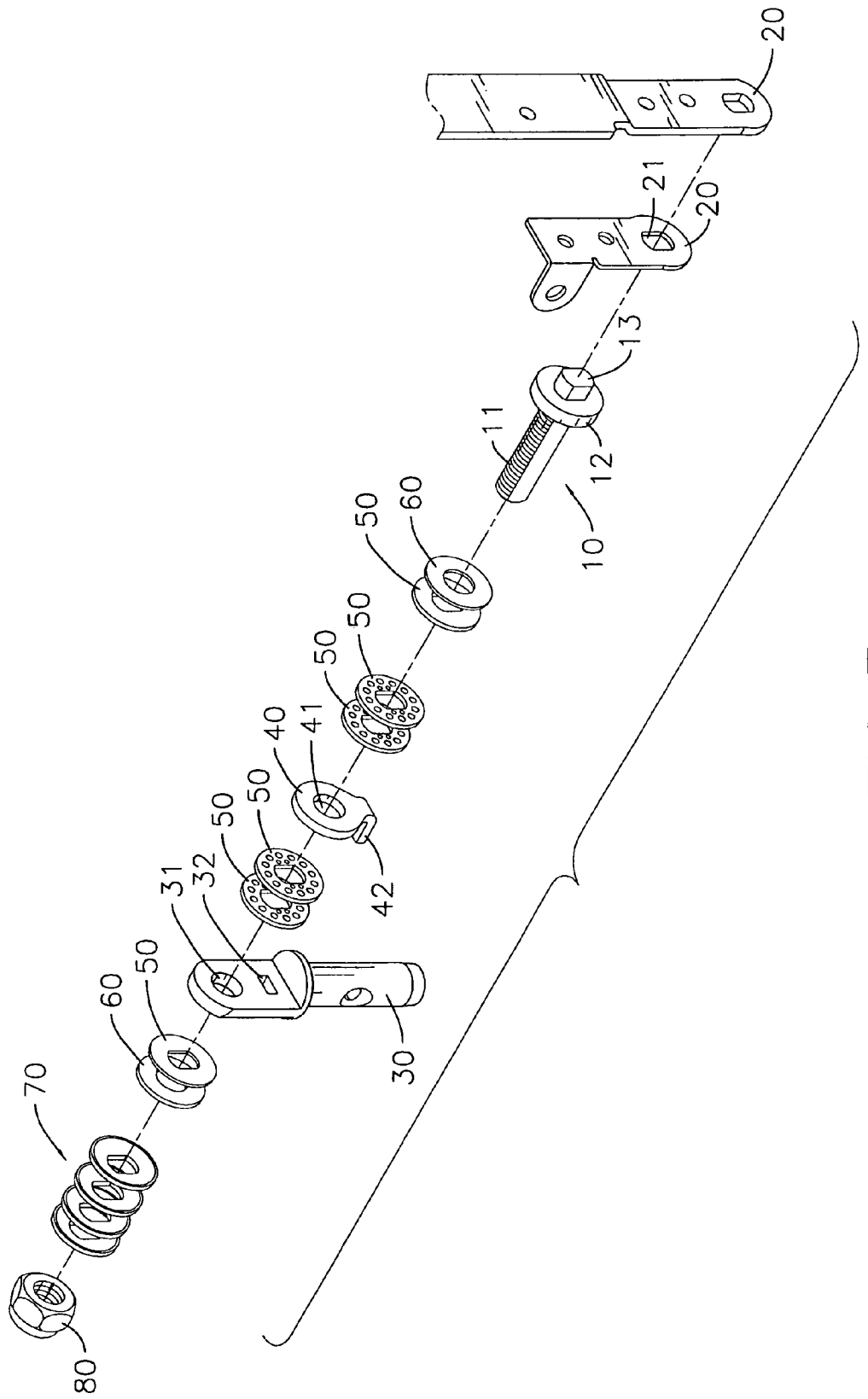
FIG. 3 is an exploded perspective view of the hinge of another embodiment of the present invention.

With reference to FIG. 3, it is noted that the friction bracket (40) as well as the friction pads (50) are sandwiched between the fixed bracket (30) and the crown (12) of the shank (10). However, in FIG. 2, the friction bracket (40) as well as the friction pads (50) are sandwiched between the fixed bracket (30) and the resilient assembly (70).

Figure 4:
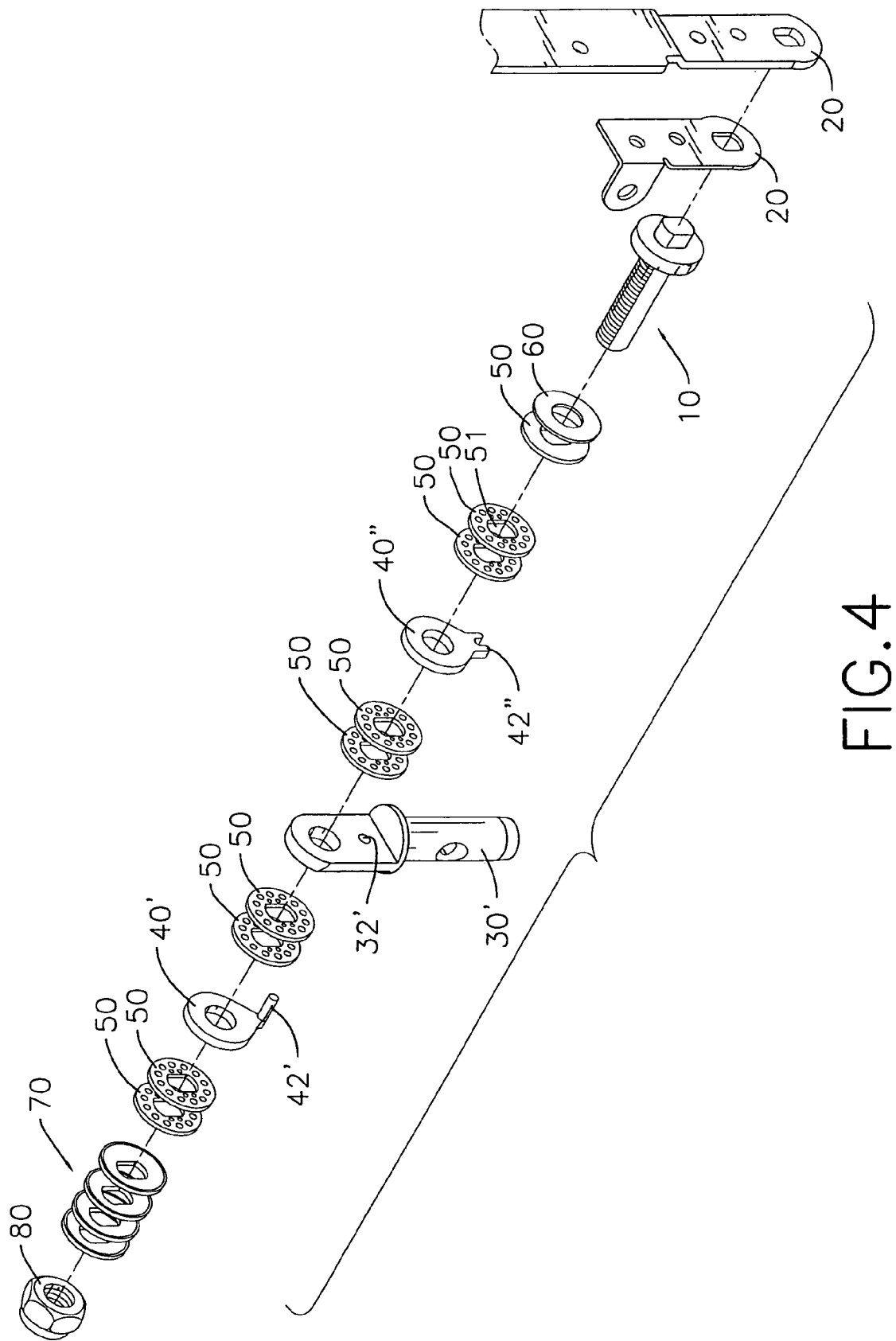
FIG. 4 is an exploded perspective view of still a different embodiment of the present invention.

With reference to FIG. 4, it is seen that the securing hole (32') of the fixed bracket (30') is now circular instead of rectangular as shown in FIG. 2 and the friction bracket (40) is now composed of a first friction bracket (40') and a second friction bracket (40"). The first friction bracket (40') has a rod (42') extending from a peripheral edge thereof to extend through the circular securing hole (32') of the fixed bracket (30). The second friction bracket (40") has two arms (42") extending from a peripheral edge thereof to be adjacent to each other so that after the rod (42') extends through the securing hole (32') of the fixed bracket (32'), the rod (42') is able to be clamped by the two arms (42") of the second friction bracket (40"). Thus the first friction bracket (40') and the second friction bracket (40") are secured to the fixed bracket (30').

Figure 5:
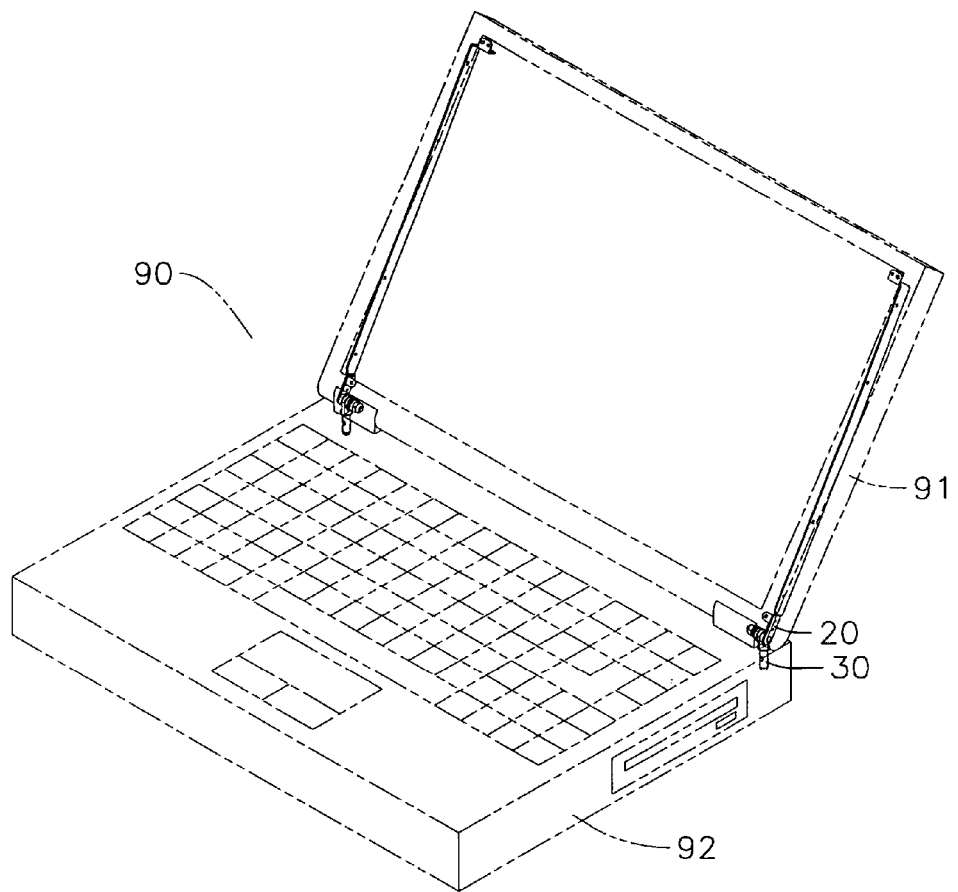
FIG. 5 is an operational view showing that the hinge of the present invention is applied to a laptop computer.

With reference to FIG. 5, it is noted that after the rotation bracket (20) is securely connected to the display (91) of the laptop computer (90) and the fixed bracket (30) is securely connected to the base (92) of the laptop computer (90), the pivotal movement of the display (91) drives the shank (10) to rotate, which drives the friction bracket (40) as well as the friction pads (50) to pivot relative to the fixed bracket (30). Because the friction pads (50) are provided to two opposite sides of the friction bracket (40), as shown in FIGS. 2 and 3 or as shown in FIG. 4 even the friction bracket is now composed of the first friction bracket (40') and the second friction bracket (40"), friction force to hold the display (91) in position is enhanced.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge comprising:

a shank having an irregular shape, the shank including a threaded portion, a crown formed thereon and a head integrally formed with the threaded portion, wherein the crown is extending axially from the shank;

a rotation bracket adapted to securely connect to a display of a laptop computer and having a hole being mounted around the head to keep the rotation bracket from rotating relative to the shank;

a fixed bracket adapted to securely connect to a base of the laptop computer and having a through hole being mounted around the threaded portion of the shank to freely extend;

a first friction bracket and a second friction bracket pivotally mounted around the shank and located at both sides of the fixed bracket respectively, the first friction bracket having a rod extending from a peripheral edge thereof to correspond to and extend through a securing hole defined in the fixed bracket, the second friction bracket having two arms extending from a peripheral edge thereof to be adjacent to each other, such that after the rod extends through the securing hole of the fixed bracket, the rod is clamped by the two arms of the second friction bracket to cause simultaneous pivotal movement of both the first and second friction bracket and the fixed bracket;

multiple friction pads provided on opposite sides of the first friction bracket and the second friction bracket, wherein each of the friction pads has an aperture configured to fit the irregular shape of the shank for being mounted around the threaded portion of the shank so that the friction pads pivot together with the shank;

a resilient assembly mounted on the threaded portion to provide urging force to the friction pads to abut the first and second friction bracket and the fixed bracket; and a securing member threadingly connected to the threaded portion to secure the friction pads, the first and second friction bracket and the resilient assembly on the shank.

* * * * *